UNITED STATES PATENT OFFICE.

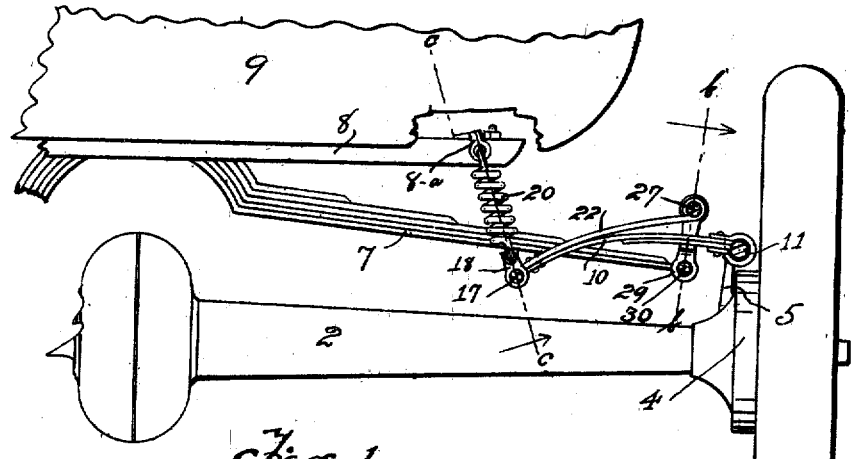
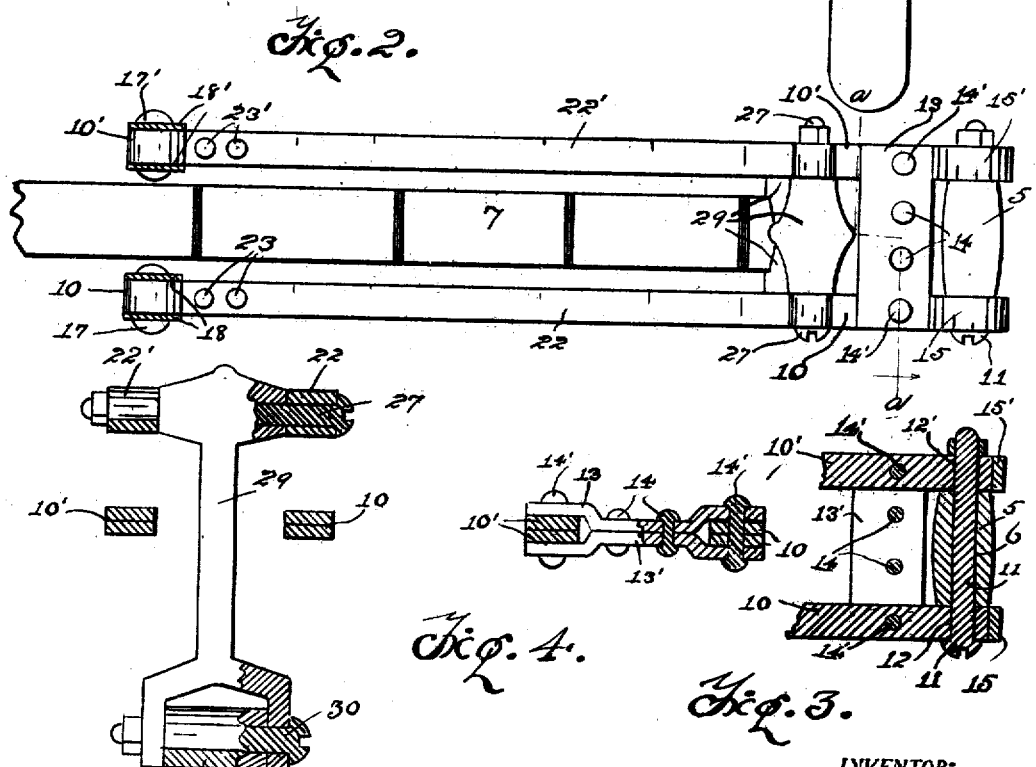

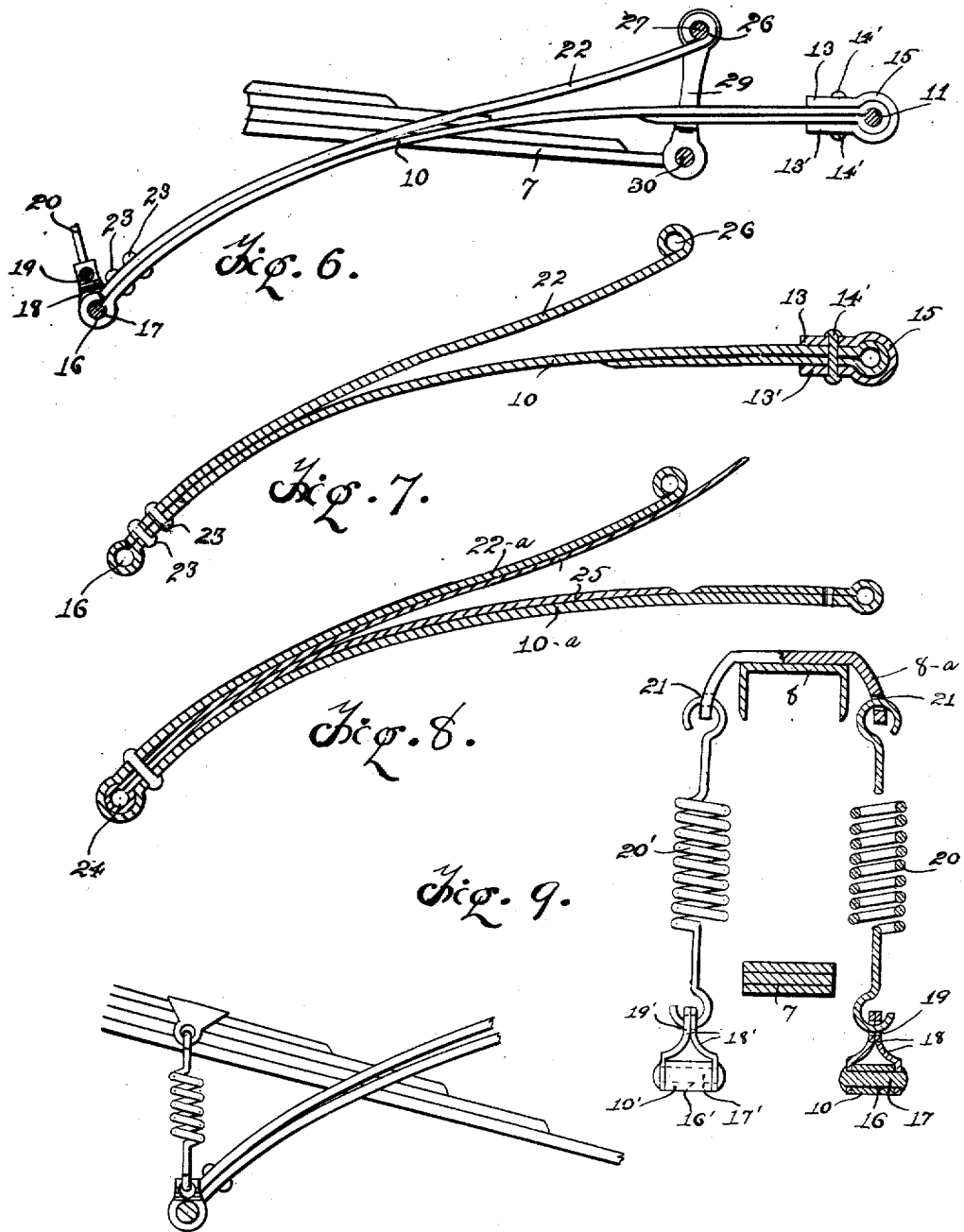

GEORGE F. VOIGHT, OF SAN FRANCISCO, CALIFORNIA.

SPRING SUSPENSION FOR ROAD-VEHICLES.

1,274,638.     Specification of Letters Patent.     Patented Aug. 6, 1918.

Application filed March 2, 1918. Serial No. 220,029.

*To all whom it may concern:*

Be it known that I, GEORGE F. VOIGHT, a citizen of the United States, residing at San Francisco, in the county of San Francisco and State of California, have invented new and useful Improvements in Spring Suspensions for Road-Vehicles, of which the following is a specification.

My invention relates to improvements in spring suspensions for road vehicles.

It has for one of its objects to provide a new and improved form of spring suspensions which may be used in conjunction with the principal leaf spring of a road vehicle. Another object is to provide a spring suspension which may be more flexible and more quickly responsive than is the principal leaf spring.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein—

Figure 1 is a view of the right-hand side of the rear end of an automobile (portions of the automobile body being broken away), showing my invention applied thereto.

Fig. 2 is a top or plan view of my invention, showing certain portions in section, and showing also a portion of the vehicle's principal leaf spring.

Fig. 3 is a plan view of a portion of the invention, showing portions in section.

Fig. 4 is a view of a portion of the invention taken on line a—a, Fig. 2, portions being shown in section.

Fig. 5 is a view taken substantially on line b—b of Fig. 1 showing the connecting means between one end of the principal leaf spring and my auxiliary spring shock absorber, portions being shown in section.

Fig. 6 is a view in elevation of a portion of my invention, portions being shown in section and other portions being broken away, showing also a portion of the principal leaf spring.

Fig. 7 is a vertical sectional view of a portion of the invention.

Fig. 8 is a vertical sectional view of a portion of the invention in a somewhat modified form.

Fig. 9 is a view of the invention taken approximately on line c c, Fig. 1, portions being in section, showing also a portion of the principal leaf spring in section.

Fig. 10 shows a portion of the invention in a modified form, and a portion of the principal leaf spring.

Similar numerals refer to similar parts throughout the several figures.

It is to be observed that the invention as illustrated in Fig. 1, is drawn on a smaller scale than the subsequent figures.

Referring to the drawings in detail, the numeral 2 designates a road vehicle axle supported at one end by a wheel 3. At one end of said axle is a brake drum 4 rigidly supporting a spring hanger 5 provided at its upper or free end with a transverse opening 6. 7 is the rear principal leaf spring of the vehicle and is disposed above the axle 2 and extends in a general line therewith. The outer end of the spring 7 terminates adjacent the drum 4. The spring 7 supports a frame 8, which supports the vehicle body 9. 10 10' are two flexible levers spaced a suitable distance apart and have their inner ends disposed one on each side of the principal spring 7 and are free to move relative thereto. The outer ends of the levers 10 10' are pivotally connected to the spring hanger 5 by means of a pivot pin 11 extending through the opening 6 in said hanger and through apertures 12 12' in the outer ends of said levers. The said outer ends of said levers are more or less rigidly connected together by means of connecting plates 13 13', which I secure together by means of rivets 14 14'. I prefer to join two edges of the said plates together by bands 15 15', which I pass around the ends of the levers forming the apertures 12 12'. The bands 15 15' being integral with the plates 13 13'. The inner or free ends of the levers 10 10' are provided with transverse openings 16 16' through which extend pivot pins 17 17' supporting connecting plates 18 18', which plates are provided adjacent their upper ends with apertures 19 19', into which are hooked one end of coiled springs 20 20'. The opposite ends of said coiled springs are suitably anchored to the frame 8 by suitable means. I prefer to do this by mounting a yoke 8ª upon the frame as shown in Figs. 1 and 9 of the drawings, and hooking one end of each of the springs into openings 21 21' provided for the purpose in the free ends of said yoke. Upon the upper side of the levers 10 10' and extending in a general direction therewith, are disposed a pair of auxiliary flexible levers 22 22'. The inner ends of said auxiliary levers are secured, preferably rigidly, to the inner ends of the levers 10 10'. The outer or free ends of the auxiliary levers terminate a distance above the levers 10 10', and are yieldingly held in such position by the tension of the latter. I prefer to fasten the levers 10 10' and the auxiliary levers 22 22' together at the ends aforesaid, by means of rivets 23 23'. However, in the modified form shown in Fig. 8, the lever 10ª and the auxiliary lever 22ª are formed out of a single piece of metal which is doubled back upon itself, thereby forming a transversely extending eye 24. In this modified form I have confined a flexible supporting spring or lever 25 between the levers 10ª and 22ª for the purpose of strengthening and assisting said last mentioned levers.

The outer or free ends of the auxiliary levers 22 22' are provided with transversely extending openings 26 26' through which extends a pivot pin 27, which pin also extends through an opening 28 extending through the upper end of a connecting link 29, the lower or opposite end of which connecting link being pivotally connected to one end of the principal leaf spring 7 by means of a pivot pin 30. The arrangement of said link 29 and the pivot pins 27 and 30 being such that the principal spring 7 may be free to move a certain distance longitudinally of itself relative to the auxiliary levers 22 22'.

With my invention as described in the foregoing and shown in the drawings, it is obvious that the coiled springs 20 20' may yielding or resiliently support the inner ends of the flexible levers 10 10', and that the said levers 10 10' may yieldingly support the auxiliary levers 22 22', and that the assembly of said levers and springs may yieldingly support one end of the principal leaf spring 7.

In Fig. 10 I have shown a modification of the invention in that I support the yoke 8ᵇ by mounting it upon the principal spring 7, instead of mounting it upon the frame 8 as shown in the regular form.

NOTE.—Throughout the specification and the claims, when reference is made to the inner end or, ends or to the outer end or ends of either the levers 10 10' or the auxiliary levers 22 22', then outer end or ends shall indicate the end or ends nearest the vehicle wheel, and inner end or ends shall indicate the end or ends farthest from the wheel.

Having described my invention, I claim:

1. The combination with the frame, principal leaf spring and axle of a road vehicle, of a pair of spring leaf levers pivotally supported at their outer ends by the axle, the levers being disposed one on each side of the principal leaf spring and free to move relatively thereto, a more or less rigid connection between the levers adjacent their outer ends, the inner ends of the levers terminating below an intermediate section of the principal leaf spring, a coil spring connection between each of said ends and a section of the vehicle vertically movable relatively to the axle, the arrangements being such that said inner ends may move downwardly relatively to said section of the vehicle against the tension of the coil springs, an intermediate section of each of the levers being bowed upwardly relatively to an approximately horizontal plane extending through the inner and the outer ends of the levers, and a connection between the levers intermediate their ends and one end of the principal leaf spring, the arrangements being such that if a proper load is applied to said end of the principal leaf spring the said intermediate section of the levers may move downwardly and in a direction toward said horizontal plane.

2. The combination with the frame, principal leaf spring and axle of a road vehicle, of a resiliently flexible leaf spring lever oscillatorily pivoted at its outer end to the axle, a connection between the inner end of the lever and a support vertically movable relatively to the axle, the intermediate section of the lever being bowed upwardly relatively to a straight line drawn to extend through its ends, a connection between the lever and one end of the principal leaf spring, the arrangements being such that if sufficient weight is applied to said end of the principal leaf spring it will cause said upwardly bowed section to move downwardly in a direction of said line.

3. The combination with the frame, principal leaf spring and axle of a road vehicle, of a pair of resiliently flexible levers having substantially flat upper and lower sides, the levers being spaced a distance apart and disposed one on each side of the principal leaf spring adjacent one end thereof, the inner ends of the levers terminating below a section of said spring intermediate its ends, a connection between the levers adjacent their outer ends, a pivotal connection between the outer ends of the levers and the axle, a connection between the inner ends of the levers and a support vertically movable relatively to the axle, the levers having a section intermediate their ends bowed upwardly relatively to an approximately horizontal plane extending through said inner and outer ends of the levers, the arrangements being such that said upwardly bowed section may be moved downwardly against the tension of the levers in a direction of said plane thereby causing the inner ends of the levers to move along said plane in a direction opposite to their outer ends, and a connection between the levers intermediate their ends and one end of the principal leaf spring.

4. In a spring suspension for road vehicles, an oscillatory lever pivoted at one end to a support, a relatively movable support for the other end, and an auxiliary lever disposed above said first mentioned lever and having a section seating thereon, the inner ends of the levers being connected together, the outer end of the auxiliary lever being adapted to support one end of the vehicle's principal leaf spring.

5. The combination with the frame, principal leaf spring and axle of a road vehicle, of an oscillatory lever pivotally supported at its outer end by the axle, a relatively movable support for its inner end, an auxiliary lever, a connection between the levers adjacent their inner ends, the second mentioned lever extending in a general direction with the first mentioned lever and disposed thereon in such a manner that a section thereof intermediate its ends will support a section of the second mentioned lever intermediate its ends, and a connection between the outer end of the second mentioned lever and one end of the principal leaf spring.

6. The combination with the frame, principal leaf spring and axle of a road vehicle, of a resiliently flexible lever pivotally supported at its outer end by the axle, a relatively vertically movable support for its inner end, the lever having a substantially upper flat side and a substantially lower flat side, a resiliently flexible auxiliary lever having a substantially upper flat side and a substantially lower flat side, the auxiliary lever extending in a general direction with the first mentioned lever and having a section intermediate its ends in engagement with the upper side of a section of the first mentioned lever, a connection between the levers adjacent their inner ends, and a connection between the outer end of the auxiliary lever and one end of the principal leaf spring.

7. The combination with the frame, principal leaf spring and axle of a road vehicle, of an oscillatory leaf spring lever having its outer end pivotally supported by the axle, an auxiliary leaf spring lever lying upon the upper flat side of the first mentioned lever and extending in a general direction therewith, the inner ends of the levers being disposed in close relation with each other, a connection between the inner ends of the levers, a support for the inner ends of the levers vertically movable relatively to the axle, the outer end of the auxiliary lever being bent upwardly and spaced apart from the oscillatory lever, and a connection between said outer end of the auxiliary lever and one end of the principal leaf spring, the arrangements being such that said outer end of the auxiliary lever may move downwardly and toward the oscillatory lever against the tension of said levers.

8. The combination with the frame, principal leaf spring and axle of a road vehicle, of an oscillatory leaf spring lever pivotally supported at its outer end by the axle, an auxiliary leaf spring lever disposed above the oscillatory lever and extending in a general direction therewith and having a section intermediate its ends seating upon a longitudinally registering section of the oscillatory lever, a connection between the inner ends of the levers, a connection between the inner ends of the levers and a support movable relatively to the axle, the outer end of the auxiliary lever being spaced upwardly from the oscillatory lever and normally maintained in such position by the tension of the levers, and a connection between the outer end of the auxiliary lever and one end of the principal leaf spring.

9. The combination with the frame, principal leaf spring and axle of a road vehicle, of a pair of leaf spring levers disposed one above the other, a connection between the inner ends of the levers, corresponding portions of the levers intermediate their ends being in bearing engagement the one against the other thereby causing the outer ends of the levers to be resiliently yieldingly maintained a distance apart by the tension of the levers, the outer end of the lower lever being pivotally supported by the axle, the inner ends of the levers being supported by a support vertically movable relatively to the axle, and the outer end of the upper lever being adapted to support one end of the principal leaf spring.

10. A spring suspension for road vehicles, comprising a pair of resiliently flexible leaf spring levers laterally spaced a distance apart and disposed one on each side of the vehicle's principal leaf spring and free to move relatively thereto, the levers being pivotally attached to their outer ends to the vehicle axle, a connection between one end of said principal leaf spring and the levers intermediate their ends, the inner ends of the levers projecting below an intermediate section of said principal leaf spring, and a connection between said inner ends of the levers and a portion of the vehicle movable relatively to said axle.

11. A spring suspension for road vehicles.

comprising a pair of resiliently flexible leaf spring levers laterally spaced a distance apart, and disposed one on each side of the vehicle's principal leaf spring and free to move relatively thereto, the levers being pivotally attached at their outer ends to the vehicle axle, a more or less rigid connection between the levers adjacent their outer ends, a connection between the levers intermediate their ends and one end of said principal leaf spring, the inner ends of the levers projecting below an intermediate section of the principal leaf spring, and a pair of resiliently extendible coil springs having each a lower end attached to one of said inner ends of the levers and having each an upper end attached to a portion of the vehicle movable relatively to said axle, the arrangements being such that said inner ends of the levers may move downwardly relatively to said portion of the vehicle against the tension of said coil springs.

12. The combination with the frame, principal leaf spring and axle of a road vehicle, of a pair of resiliently flexible leaf spring levers laterally spaced a distance apart and disposed one on each side of said principal leaf spring and free to move relatively thereto, the levers being pivoted at their outer ends to the axle, a connection between the levers adjacent their outer ends, the levers being adapted to support one end of said principal leaf spring intermediate their ends, the inner ends of the levers projecting below a section on said principal leaf spring intermediate its ends, and a connection between each of said inner ends of the levers and portion of the vehicle movable relatively to the axle, the arrangements being such that the intermediate middle section of each of said levers may be deflected downwardly from its normal position relatively to its ends against the tension of the lever.

13. The combination with the frame, principal leaf spring and axle of a road vehicle, of a resiliently flexible leaf spring lever pivoted at its outer end to the axle, the lever being disposed at one side of said principal leaf spring and free to move relatively thereto, the lever being adapted to support one end of said principal leaf spring intermediate its ends, the inner end of the lever projecting below said principal leaf spring, a resiliently longitudinally extendible coil spring having its lower end attached to said inner end of the lever and its upper end attached to a support movable relatively to said axle, the arrangements being such that said inner end of the levers may move downwardly relatively to said support against the tension of said coil spring and that said inner end of the lever may be resiliently deflected upwardly relatively to its intermediate middle section.

14. The combination with the frame, principal leaf spring and axle of a road vehicle, of a resiliently flexible leaf spring lever pivoted at its outer end to the axle, a connection between the inner end of the lever and a support movable relatively to the axle, and a resiliently yieldable connection between one end of the principal leaf spring and the lever intermediate the ends thereof.

15. The combination with the frame, principal leaf spring and axle of a road vehicle, of a resiliently flexible lever pivoted at its outer end to the axle, a connection between the inner end of the lever and a support movable relatively to the axle, an auxiliary spring supported by the lever intermediate its ends, and a pivotal connection between said auxiliary spring and one end of said principal leaf spring.

16. The combination with the frame, principal leaf spring and axle of a road vehicle, of a pair of oscillatory levers pivoted at their outer ends to the axle, the inner ends of the levers being laterally spaced apart and disposed one on each side of said principal leaf spring, a resilient longitudinally extendible coil spring connected to each of said inner ends and attached to the free ends of a yoke having its intermediate section seating upon a portion of the vehicle subject to rebound, and a resiliently yieldable connection between said levers intermediate their ends and one end of the principal leaf spring.

17. In a spring suspension for road vehicles, a spring hanger rigidly secured to the vehicle axle and having an upwardly extending end free, a pair of oscillatory levers laterally spaced apart, one of said levers having its outer end disposed at one side of said upwardly extending end of the spring hanger and pivotally attached thereto and its inner end disposed at one side of the vehicle's principal leaf spring, the other of said levers having its outer end disposed at the opposite side of said upwardly extending end of the spring hanger and pivotally attached thereto and its inner end disposed on the opposite side of said principal leaf spring, a connecting plate extending across from one of said levers to the other lever adjacent the outer ends of said levers, means for rigidly securing portions of said plate to the levers, the arrangements being such that said outer ends of the levers may be held apart at a definite distance by means of said plate, a resilient connection between said inner ends of the levers and a portion of the vehicle subject to rebound, and a connection between said levers intermediate their ends and one end of said principal leaf spring.

18. In a spring suspension for road vehicles, the combination of a pair of oscillatory levers laterally spaced a distance apart, with a plate, and pins for rigidly securing portions of said plate to portions of the levers intermediate their ends, the plate being adapted for holding said levers apart at said distance.

19. In a spring suspension for road vehicles, a pair of resiliently flexible levers laterally spaced apart and disposed one on each side of the vehicle's principal leaf spring, the inner ends of the levers terminating below the body of the vehicle and adapted to be supported by a portion of the vehicle subject to rebound, the outer ends of the levers being pivotally attached to the vehicle axle, the levers being adapted to support one end of said principal leaf spring.

20. In a spring suspension for road vehicles, a pair of resiliently flexible leaf spring levers laterally spaced apart and disposed one on each side of the vehicle's principal leaf spring, the inner ends of said levers terminating below the body of the vehicle and adapted to be resiliently connected to a portion of the vehicle subject to rebound, the outer ends of the levers being pivotally attached to the vehicle axle, the levers being adapted to support one end of said principal leaf spring.

21. The combination with the frame principal leaf spring and axle of a road vehicle, of a resiliently flexible lever pivotally attached at its outer end to the axle, the inner end section of the lever being inclined downwardly from the horizontal and terminating below the body of the vehicle, a connection between the inner end of the lever and a support movable relatively to the axle, and a connection between the lever intermediate its ends and one end of the principal leaf spring, the arrangements being such that the downward movements of said support will permit the said inner end of the lever to move downwardly along a line extending outwardly from the vertical.

In testimony that I claim the foregoing as my own, I have hereunto affixed my signature.

GEORGE F. VOIGHT.